United States Patent [19]

Shimura

[11] Patent Number: 5,347,265
[45] Date of Patent: Sep. 13, 1994

[54] INFORMATION PROCESSING APPARATUS PROVIDING A CONNECTION STATE

[75] Inventor: Akihiro Shimura, Tokyo, Japan

[73] Assignee: Canon Kabushiki Kaisha, Tokyo, Japan

[21] Appl. No.: 121,253

[22] Filed: Sep. 15, 1993

Related U.S. Application Data

[63] Continuation of Ser. No. 795,749, Nov. 21, 1991, abandoned.

[30] Foreign Application Priority Data

Nov. 21, 1990 [JP] Japan ................................. 2-316485

[51] Int. Cl.⁵ ............................................. G08B 21/00
[52] U.S. Cl. ................................... 340/653; 340/635; 340/687; 439/489
[58] Field of Search ............... 340/652, 687, 635, 653, 340/656, 654; 439/488, 489, 490; 324/538, 158 R, 133; 200/51.07

[56] References Cited

U.S. PATENT DOCUMENTS

| | | | |
|---|---|---|---|
| 4,507,697 | 3/1985 | Ozil et al. | 340/687 X |
| 4,849,743 | 7/1989 | Ohno | 340/687 |
| 4,949,035 | 8/1990 | Palmer, II | 340/687 X |

*Primary Examiner*—Jeffery A. Hofsass
*Attorney, Agent, or Firm*—Fitzpatrick, Cella, Harper & Scinto

[57] ABSTRACT

An information processing apparatus which has an apparatus main body having an operation panel and a display. A main control unit is detachably attached as a board into the apparatus main body and controls the whole apparatus such as a copying apparatus, a facsimile apparatus, or printer. A detecting circuit is provided for the apparatus main body and detects a connecting state of the operation panel of the apparatus main body and the main control unit. When the operation panel is not connected to the main control unit, the apparatus displays an error message by the display. The detecting circuit detects the connecting state by checking whether the operation panel has received an initialization command from the main control unit within a predetermined time after the turn-on of the power source or not.

12 Claims, 4 Drawing Sheets

INFORMATION PROCESSING APPARATUS PROVIDING A CONNECTION STATE

This application is a continuation of application Ser. No. 07/795,749 filed Nov. 21, 1991, now abandoned.

BACKGROUND OF THE INVENTION

1. Field of the Invention

The invention relates to an information processing apparatus having a main control unit which controls a copying apparatus, a facsimile apparatus, or the like and is detachable from the apparatus and a main body on which an operation panel is provided.

2. Related Background Art

Among conventional information processing apparatuses such as facsimile apparatuses, a wellknown apparatus is one in which an operation unit (including a display, an input unit, and the like) is controlled by only a main control unit. For example, the portion of the facsimile apparatus in which a failure has occurred is displayed as an error message in accordance with the operation unit by an instruction from the main control unit. By seeing the error message, the operator is made aware of the occurrence of the failure in the facsimile apparatus.

Among the above-described facsimile apparatuses, there are many apparatuses in which the main control unit is arranged on a board which is detachable from the apparatus by a connector.

In the above conventional facsimile apparatuses, for instance, when a service man or the like repairs and inspects the inside of the facsimile apparatus, if the board on which the main control unit is arranged is removed from the facsimile apparatus the operation unit is not connected to the main control unit. In such a case, therefore, the main control unit cannot send an instruction to the operation unit, causing a problem wherein the operation unit cannot display an error message.

SUMMARY OF THE INVENTION

It is an object of the invention to provide an information processing apparatus in which a main control unit is detachably provided for a main body, wherein even when the main control unit and the main body are in a defective connecting state, the operator is made aware of such a defective state.

According to the invention, detecting means detects whether a main control unit and a main body are connected, and even when the main control unit is not connected, an error message is displayed by display means of the main body.

Therefore, even when an instruction is not sent from the main control unit to the display means, information indicating that the main control unit is not connected can be displayed by the display means.

The above and other objects and features of the present invention will become apparent from the following detailed description and the appended claims with reference to the accompanying drawings.

BRIEF DESCRIPTION OF THE DRAWINGS

FIG. 3(2) is a flowchart showing the operation of the operation panel 20 in the first embodiment;

DETAILED DESCRIPTION OF THE PREFERRED EMBODIMENTS

Preferred embodiments of the invention will be described in detail hereinbelow with reference to the drawings.

Figure 2:
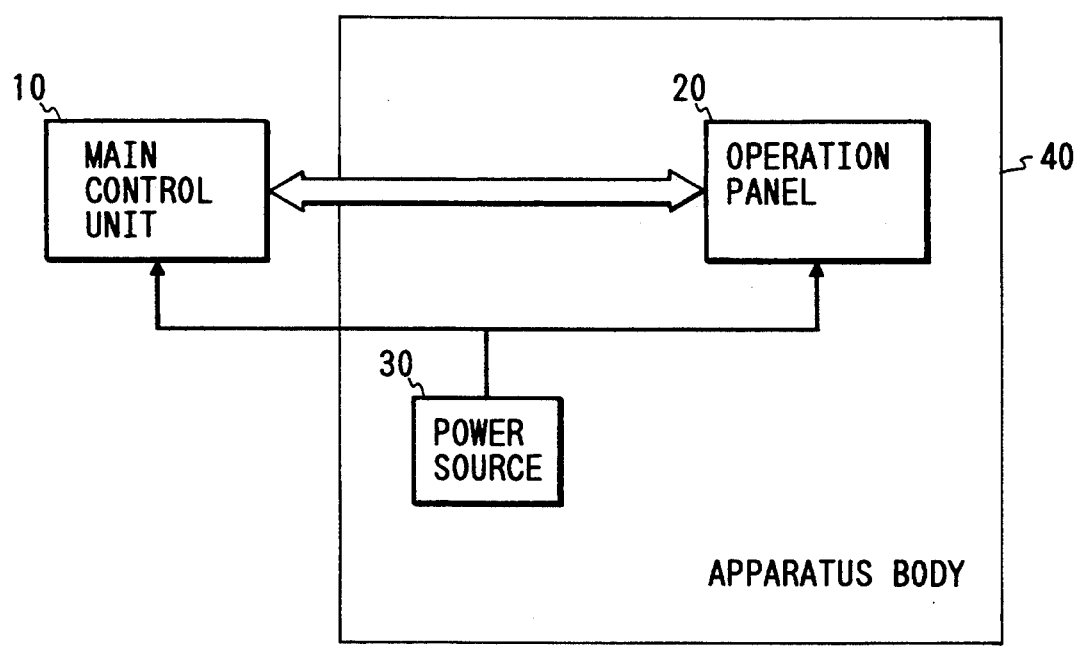
FIG. 2 is a block diagram showing further the first embodiment.

FIG. 2 is a block diagram showing one embodiment of the invention.

This embodiment comprises: a main control unit 10 to control an operation panel 20; the operation panel 20 displays information in accordance with a command from the main control unit 10; and a power source unit 30 to supplies power to the main control unit 10 and the operation panel 20.

For example, a printer is one example of as an apparatus main body 40. That is, there is a case where the printer is constructed by a printer engine and a printer controller. In the case of a page printer, a printer controller (corresponding to the main control unit 10) converts a page describing language from a host computer into bit map data and is attached as a board into the printer engine (apparatus main body). At this time, the operation panel 20 is generally controlled by the main control unit 10. Therefore, when an error or the like occurs in the printer engine, an error message or the like is displayed on the operation panel 20 under the control of the main control unit 10.

The main control unit 10 sends an initialization command to the operation panel 20 after the power source unit 30 is activated. In the first embodiment, when the initialization command is not received from the main control unit 10, the operation panel 20 displays an error message.

Figure 1:
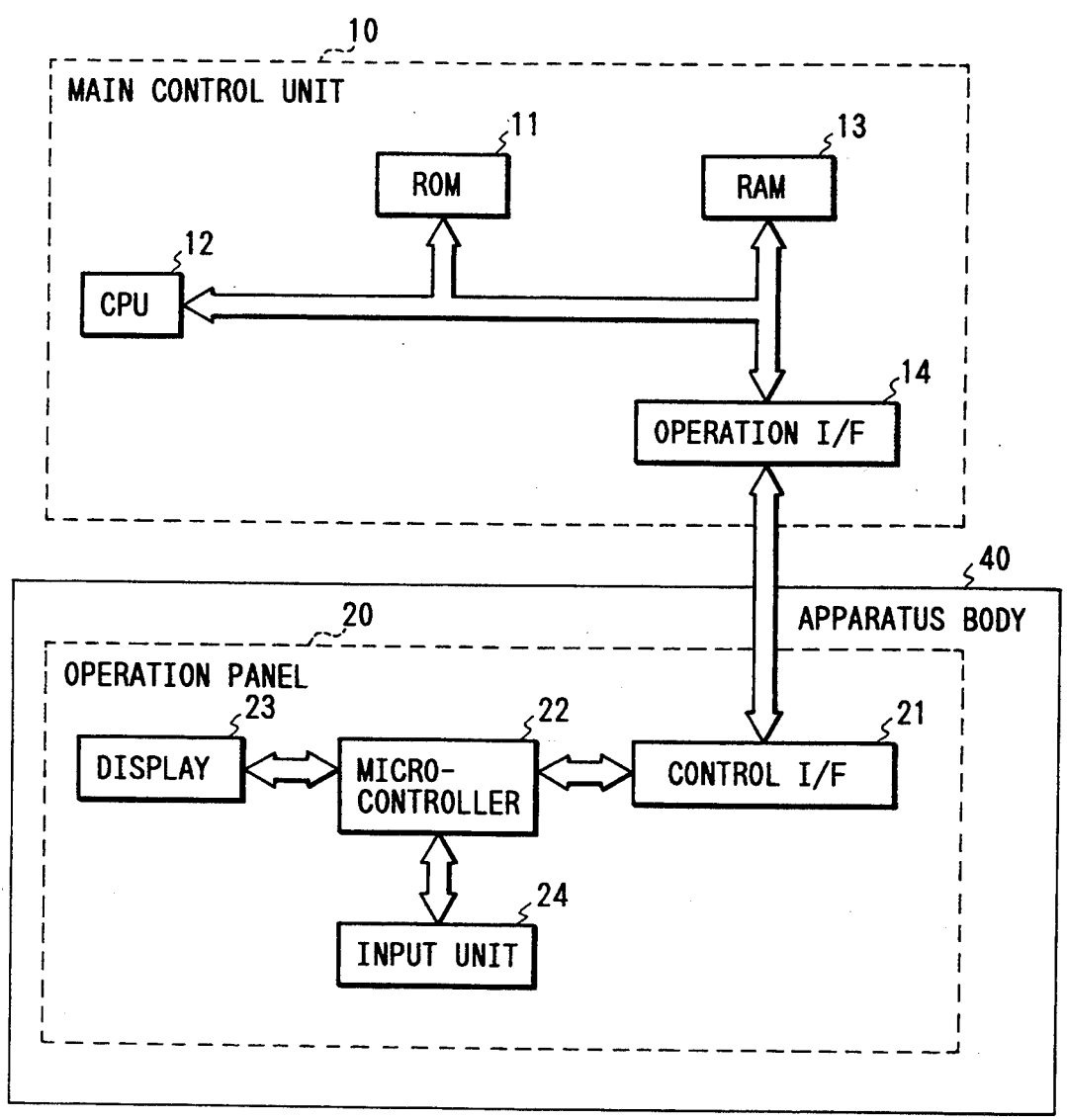
FIG. 1 is a block diagram showing a main control unit 10 and an operation panel 20 constructing a first embodiment of the invention.

FIG. 1 is a block diagram showing the main control unit 10 and the operation panel 20 in the first embodiment.

The main control unit 10 comprises: a ROM 11 to store a program by which the main control unit 10 operates; a CPU 12 to read out the program from the ROM 11 and to control each section; a RAM 13 which is used as a work area of the CPU 12; and an operation I/F (interface) 14 to transmit and receive information to/from the operation panel 20.

The CPU 12 reads out the initialization command from the ROM 11 and sends to the operation panel 20 upon completion of the initialization of the main control unit 10.

On the other hand, the operation panel 20 comprises: a control I/F 21 to transmit and receive information to/from the main control unit 10; a micro-controller 22 to control each section in the operation panel 20 on the basis of the information received by the control I/F 21 from the main control unit 10; a display 23; and an input unit 24.

The micro-controller 22 judges whether the operation panel 20 has received the initialization command from the main control unit 10 within a predetermined time after the turn-on of the power source. When the initialization command is not received, an error message is displayed by the display 23. The micro-controller 22 means provided in the operation panel 20 is an example of the detecting means for detecting a connecting state between the main control unit 10 and the operation panel 20.

When the micro-controller 22 determines that the operation panel 20 hasn't received the initialization command from the main control unit 10 within the predetermined time after the turn-on of the power source, the display 23 displays an error message such as "The board of main control unit is removed." on the basis of a command from the microcontroller 22. The display 23 is provided in the operation panel 20 and is an example of the display means for displaying that the operation panel 20 is not connected to the main control unit 10.

The operation of the first embodiment will now be described.

Figure 3:
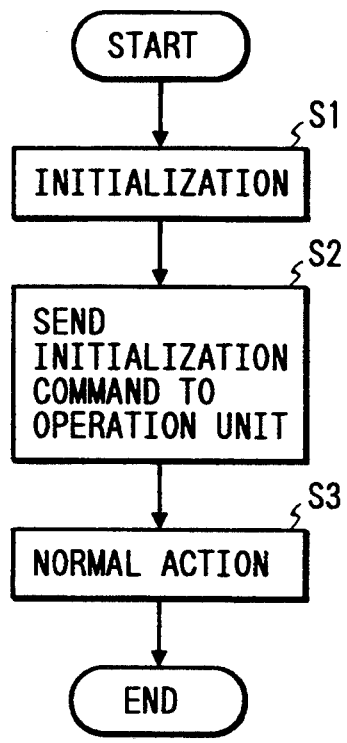
FIG. 3(1) is a flowchart showing the operation of the main control unit 10 in the first embodiment.
Figure 3:
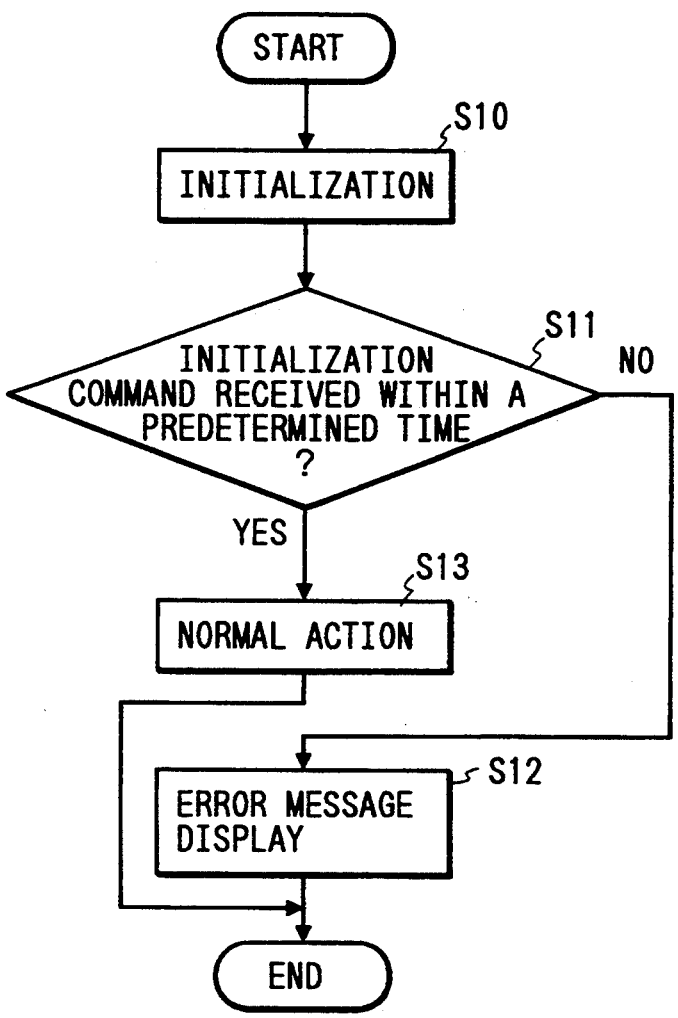

FIG. 3(1) is a flowchart showing the operation of the main control unit 10 in the first embodiment.

After the power source is turned on, the main control unit 10 is initialized (step S1). The CPU 12 reads out the initialization command from the ROM 11 and sends the read-out command to the operation panel 20 (step S2). The initialization command is used when the operation panel 20 judges the connecting state between the main control unit 10 and the operation panel 20. After the CPU 12 sends the initialization command to the operation panel 20, the CPU 12 executes ordinary operation (S3).

FIG. 3(2) is a flowchart showing the operation of the operation panel 20 in the first embodiment.

After the power source is turned on, the operation panel 20 is initialized (S10). When the micro-controller 22 determines that the operation panel 20 hasn't receive the initialization command from the main control unit 10 (S11) within a predetermined time after the turn-on of the power source, the micro-controller 22 displays the error message "the board of main control unit is removed." by the display 23 (S12).

As mentioned above, when the operation panel 20 is not connected to the main control unit 10, the operation panel 20 hasn't receive the initialization command from the main control unit 10 within a predetermined time after the turn-on of the power source, causing the error message "The board of main control unit is removed." to be displayed by the display 23. Therefore, in the case where the operation panel 20 is not connected to the main control unit 10, even when no instruction is sent from the main control unit 10, the operator is made aware that the operation panel is not connected. In such a case, by inserting the board of the main control unit 10, the operation panel 20 is connected to the main control unit 10. When some failure has occurred at that time, a message regarding the failure is displayed on the display 23.

After the operation panel 20 was initialized (S10), when the operation panel 20 is connected to the main control unit 10, the operation panel 20 receives the initialization command from the main control unit 10 within a predetermined time after the turn-on of the power source (S11). Therefore, on the basis of the initialization command from the main control unit 10, the operation panel 20 is initialized to the initial state which is required by the main control unit 10 and, after that, the ordinary operation is executed (S13).

Figure 4:
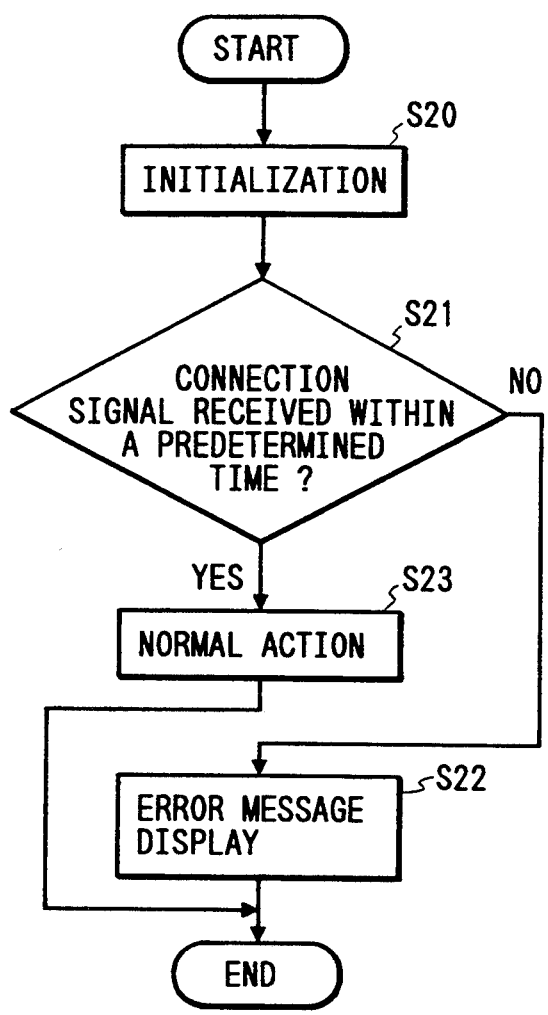
FIG. 4 is a flowchart showing the operation of the operation panel 20 in a third embodiment.

FIG. 4 is a flowchart showing another operation of the operation panel 20 in the second embodiment.

In the flowchart, upon completion of the initialization of the main control unit 10, the CPU 12 in the main control unit 10 sends a connection signal indicating that the main control unit 10 is connected with the operation panel 20 to the operation panel 20.

After the power source is turned on, the operation panel 20 is initialized (S20). When the micro-controller 22 determines that a connection signal has not been received from the main control unit 10 within a predetermined time after the turn-on of the power source (S21), the display 23 displays the error message "The board of main control unit is removed." on the basis of a command from the micro-controller 22 (S22).

As mentioned above, when the operation panel 20 is not connected to the main control unit 10, the operation panel 20 does not receive the connection signal from the main control unit 10 within the predetermined time from the turn-on of the power source, so that the error message "The board of main control unit is removed." is displayed by the display 23. Therefore, in the case where the operation panel 20 is not connected to the main control unit 10, the operator is aware that the operation panel is not connected even when an instruction is sent from the main control unit 10. In such a case, by inserting the board of the main control unit 10, the operation panel 20 is connected to the main control unit 10. If some failure has occurred at that time, the message regarding the failure is displayed by the display 23.

Figure 5:
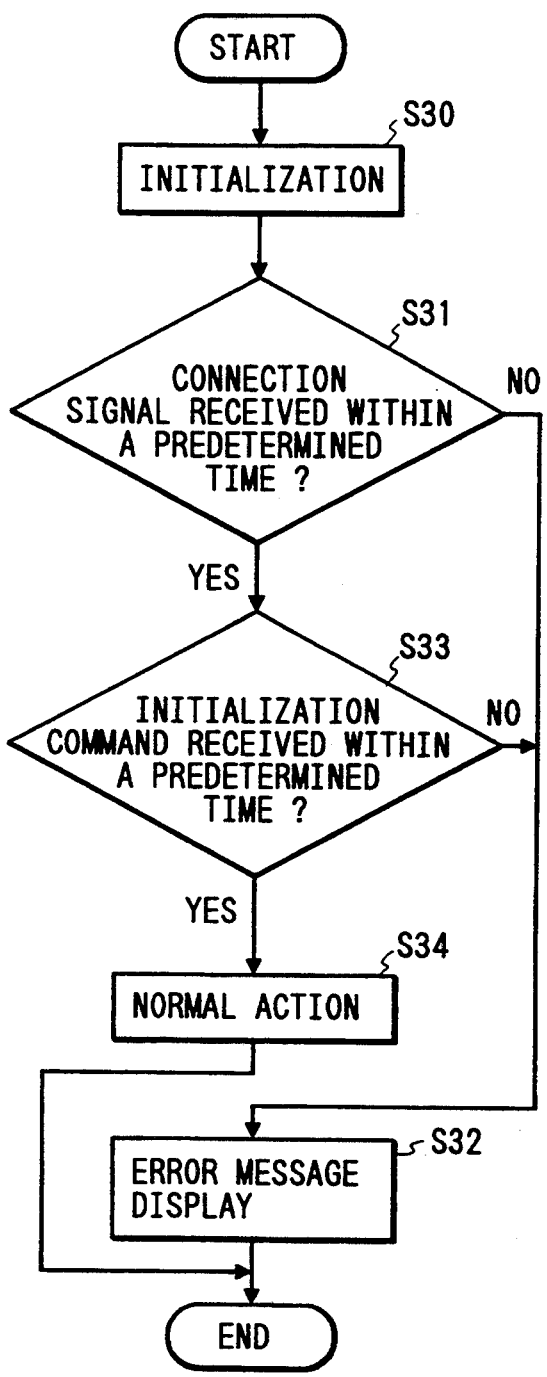
FIG. 5 is a flowchart showing further another operation of the operation panel 20 in the embodiment.

FIG. 5 is a flowchart showing further another operation of the operation panel 20 third embodiment.

The flowchart of FIG. 5 comprises a combination of the flowcharts of FIGS. 3(2) and 4 and is a flowchart showing the operation to display the error message when the operation panel 20 doesn't receive at least one of the connection signal and the initialization command.

After the power source is turned on, the operation panel 20 is initialized (S30). When the micro-controller 22 determines that a connection signal has not been received from the main control unit 10 within a predetermined time after the turn-on of the power source (S31), the micro-controller 22 displays the error message "The board of main control unit is removed." by the display 23 (S32).

When the micro-controller 22 determines that the initialization command has not been received from the main control unit 10 within the predetermined time from the turn-on of the power source (S33), the micro-controller 22 displays the error message "The board of main control unit is removed." by the display 23 (S32).

According to the invention, in the case where the apparatus main body is not connected to the main control unit or in the case of a defective connection, even when no instruction is sent from the main control unit to the operation panel, the operator can certainly know that the operation panel is not connected to the main control unit. The operator can easily cope with such a disconnection state.

What is claimed is:

1. An information processing apparatus comprising:
an apparatus main body having display means;
a main control unit which is detachably attached to the apparatus main body, said display means providing a display under control of said main control unit when said control unit is attached;
detecting means, provided for said apparatus main body, for detecting a connecting state between the apparatus main body and the main control unit; and means for controlling said display means dependent upon said detecting means or providing display information indicative of a disconnected state irrespective of the control of said main control unit when said apparatus main body and said main control unit are in a disconnected state.

2. An apparatus according to claim 1, wherein said detecting means detects the connecting state by judging whether the apparatus main body has received an initialization command from the main control unit within a predetermined time after the turn-on of a power source.

3. An apparatus according to claim 1, wherein said apparatus is a printer.

4. An apparatus according to claim 1, wherein said main control unit is attached as a board into the apparatus main body.

5. An information processing apparatus comprising:

an apparatus main body having display means;

detecting means, provided for said apparatus main body, for detecting a connecting state between the apparatus main body and a main control unit, which is detachably attached to the apparatus main body, and which controls said display means to provide a display when the main control unit is attached; and means for controlling said display means, dependent upon said detecting means, for providing display information indicative of a disconnected state, between the apparatus main body and the main control unit, irrespective of the control by the main control unit when said apparatus main body and said main control unit are in a disconnected state.

6. An apparatus according to claim 5, wherein said detecting means detects the connecting state by judging whether the apparatus main body has received an initialization command from the main control unit within a predetermined time after the turning on of a power source.

7. An apparatus according to claim 5, wherein said apparatus is a printer.

8. An apparatus according to claim 5, wherein the main control unit is attached as a board into said apparatus main body.

9. A method of controlling a display by an information processing apparatus, comprising the steps of:

providing a display under control of a main control unit, which is detachably attached to the apparatus main body, when the main control unit is attached;

detecting a connecting state between the apparatus main body and the main control unit; and controlling the display, dependent upon the connection state detected in said detecting step, to provide display information indicative of a disconnected state irrespective of the control by the main control unit when the apparatus main body and the main control unit are in a disconnected state.

10. A method according to claim 9, wherein in said detecting step, the connecting state is detected by judging whether the apparatus main body has received an initialization command from the main control unit within a predetermined time after the turning on of a power source.

11. A method according to claim 9, wherein the information processing apparatus is a printer.

12. A method according to claim 9, wherein the main control unit is attached as a board into the apparatus main body.

* * * * *

UNITED STATES PATENT AND TRADEMARK OFFICE
CERTIFICATE OF CORRECTION

PATENT NO. : 5,347,265
DATED : September 13, 1994
INVENTOR(S) : AKIHIRO SHIMURA

Page 1 of 2

It is certified that error appears in the above-identified patent and that said Letters Patent is hereby corrected as shown below:

ON TITLE PAGE

In [57] ABSTRACT, Line 6: "or" should read --or a--.

COLUMN 1

Line 17, "wellknown" should read --well known--.
Line 22, "message" should read --message by the operation unit-- and "the" should be deleted.
Line 23, "operation unit by" should be deleted.
Line 27, "above-described" should read --above-described conventional--.
Line 35, "apparatus" should read --apparatus,--.

COLUMN 2

Line 21, "to" (first occurrence) should be deleted.
Line 23, "as" should be deleted.

COLUMN 3

Line 6, "hasn't" should read --has not--.
Line 34, "hasn't receive" should read --has not received--.
Line 42, "hasn't" should read --does not--.

COLUMN 4

Line 11, "($21)," should read --(S21),--.
Line 24, "is" should read --has not been--.
Line 30, "panel 20" should read --panel 20 in the--.
Line 34, "doesn't" should read --does not--.

UNITED STATES PATENT AND TRADEMARK OFFICE
CERTIFICATE OF CORRECTION

PATENT NO. : 5,347,265

DATED : September 13, 1994

INVENTOR(S) : AKIHIRO SHIMURA

It is certified that error appears in the above-identified patent and that said Letters Patent is hereby corrected as shown below:

<u>COLUMN 5</u>

Line 2, "or" should read --for--.

Signed and Sealed this

Twenty-first Day of February, 1995

Attest:

BRUCE LEHMAN

Attesting Officer

Commissioner of Patents and Trademarks